United States Patent
Pickard et al.

(10) Patent No.: US 7,526,911 B2
(45) Date of Patent: May 5, 2009

(54) GAS TURBINE ENGINE FUEL SYSTEM WITH FUEL METERING VALVE

(75) Inventors: Andrew C. Pickard, Indianapolis, IN (US); Christopher Jack, Derby (GB); Colin Richard Barnfather, Derby (GB)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 11/702,246

(22) Filed: Feb. 5, 2007

(65) Prior Publication Data

US 2007/0180813 A1    Aug. 9, 2007

Related U.S. Application Data

(60) Provisional application No. 60/765,126, filed on Feb. 3, 2006.

(51) Int. Cl.
*F02C 9/00*    (2006.01)
(52) U.S. Cl. .................................. 60/39.281
(58) Field of Classification Search .............. 60/39.281, 60/734; 251/56, 59, 61
See application file for complete search history.

(56) References Cited

U.S. PATENT DOCUMENTS

| | | | |
|---|---|---|---|
| 621,864 A | 3/1899 | Smith | |
| 776,769 A | 12/1904 | Wisbech | |
| 902,264 A | 10/1908 | Stevens | |
| 1,231,447 A | 6/1917 | Stewart | |
| 1,751,591 A | 3/1930 | McCloskey | |
| 1,786,330 A | 12/1930 | Berkeley | |
| 2,361,227 A | 10/1944 | Mock | |
| 2,889,852 A | 6/1959 | Dunlap | |
| 3,062,007 A | 11/1962 | Szydlowski | |
| 3,207,181 A | 9/1965 | Willis | |
| 3,341,168 A | 9/1967 | Toeppen | |
| 3,630,484 A | 12/1971 | Taylor | |
| 3,688,495 A * | 9/1972 | Fehler et al. ............. | 60/39.281 |
| 3,713,290 A | 1/1973 | Gold | |
| 3,899,879 A | 8/1975 | Downing | |
| 3,934,612 A | 1/1976 | Kast | |
| 3,953,968 A * | 5/1976 | Jurisch .................... | 60/39.281 |
| 3,974,860 A | 8/1976 | Stead et al. | |
| 4,027,474 A * | 6/1977 | Demase ................... | 60/39.281 |
| 4,040,599 A | 8/1977 | Smith | |
| 4,186,773 A | 2/1980 | Flynn | |
| 4,275,558 A | 6/1981 | Hatch et al. | |
| 4,304,171 A * | 12/1981 | Lang et al. ....................... | 91/3 |
| 4,360,040 A | 11/1982 | Cove et al. | |
| 4,431,028 A | 2/1984 | Hendrick | |
| 4,440,382 A | 4/1984 | Pruvot et al. | |
| 4,516,606 A | 5/1985 | Worley | |
| 4,637,420 A | 1/1987 | Dyer | |
| 4,656,827 A * | 4/1987 | Puillet ..................... | 60/39.281 |
| 4,887,793 A | 12/1989 | Hernandez et al. | |

(Continued)

*Primary Examiner*—Thomas N Moulis
(74) *Attorney, Agent, or Firm*—Krieg DeVault LLP; Matthew D. Fair, Esq.

(57) ABSTRACT

A gas turbine engine fuel metering valve is configured to move within an operating position range having a first end position for establishing a first fuel flow rate, a second end position for establishing a second fuel flow rate, and an intermediate position located between the first and second end positions for establishing a third fuel flow rate. The first and second fuel flow rates are either both higher than or both lower than the third fuel flow rate.

20 Claims, 10 Drawing Sheets

U.S. PATENT DOCUMENTS

| | | | |
|---|---|---|---|
| 4,946,134 A | 8/1990 | Orlandi | |
| 5,054,521 A | 10/1991 | Hendrick | |
| 5,279,107 A | 1/1994 | Meisner et al. | |
| 5,308,040 A | 5/1994 | Torres | |
| 5,417,083 A | 5/1995 | Eber | |
| 5,555,720 A | 9/1996 | Wernberg et al. | |
| 5,709,079 A * | 1/1998 | Smith | 60/39.281 |
| 5,896,737 A * | 4/1999 | Dyer | 60/773 |
| 6,113,357 A | 9/2000 | Dobbs | |
| 6,173,914 B1 | 1/2001 | Hopf et al. | |
| 6,189,312 B1 | 2/2001 | Smith | |
| 6,205,766 B1 * | 3/2001 | Dixon et al. | 60/39.091 |
| 6,401,446 B1 | 6/2002 | Gibbons | |
| 6,416,032 B2 | 7/2002 | Oh | |
| 6,619,027 B1 | 9/2003 | Busch | |
| 6,651,442 B2 | 11/2003 | Davies et al. | |
| 6,751,942 B2 | 6/2004 | Mahoney et al. | |
| 7,401,461 B2 * | 7/2008 | Eick et al. | 60/39.091 |
| 2001/0039938 A1 | 11/2001 | Machida et al. | |
| 2003/0010950 A1 | 1/2003 | Schiavone et al. | |
| 2003/0019203 A1 | 1/2003 | Elliott | |
| 2003/0074884 A1 | 4/2003 | Snow et al. | |
| 2003/0084871 A1 | 5/2003 | Uchiyama et al. | |
| 2003/0136377 A1 | 7/2003 | Kowatari et al. | |
| 2003/0140625 A1 | 7/2003 | Spickard | |
| 2003/0160199 A1 | 8/2003 | Bareis et al. | |
| 2003/0183194 A1 | 10/2003 | Noguchi | |
| 2004/0003597 A1 | 1/2004 | Wieger et al. | |
| 2004/0011052 A1 | 1/2004 | Clements | |
| 2005/0011197 A1 * | 1/2005 | Tuttle et al. | 60/773 |

* cited by examiner

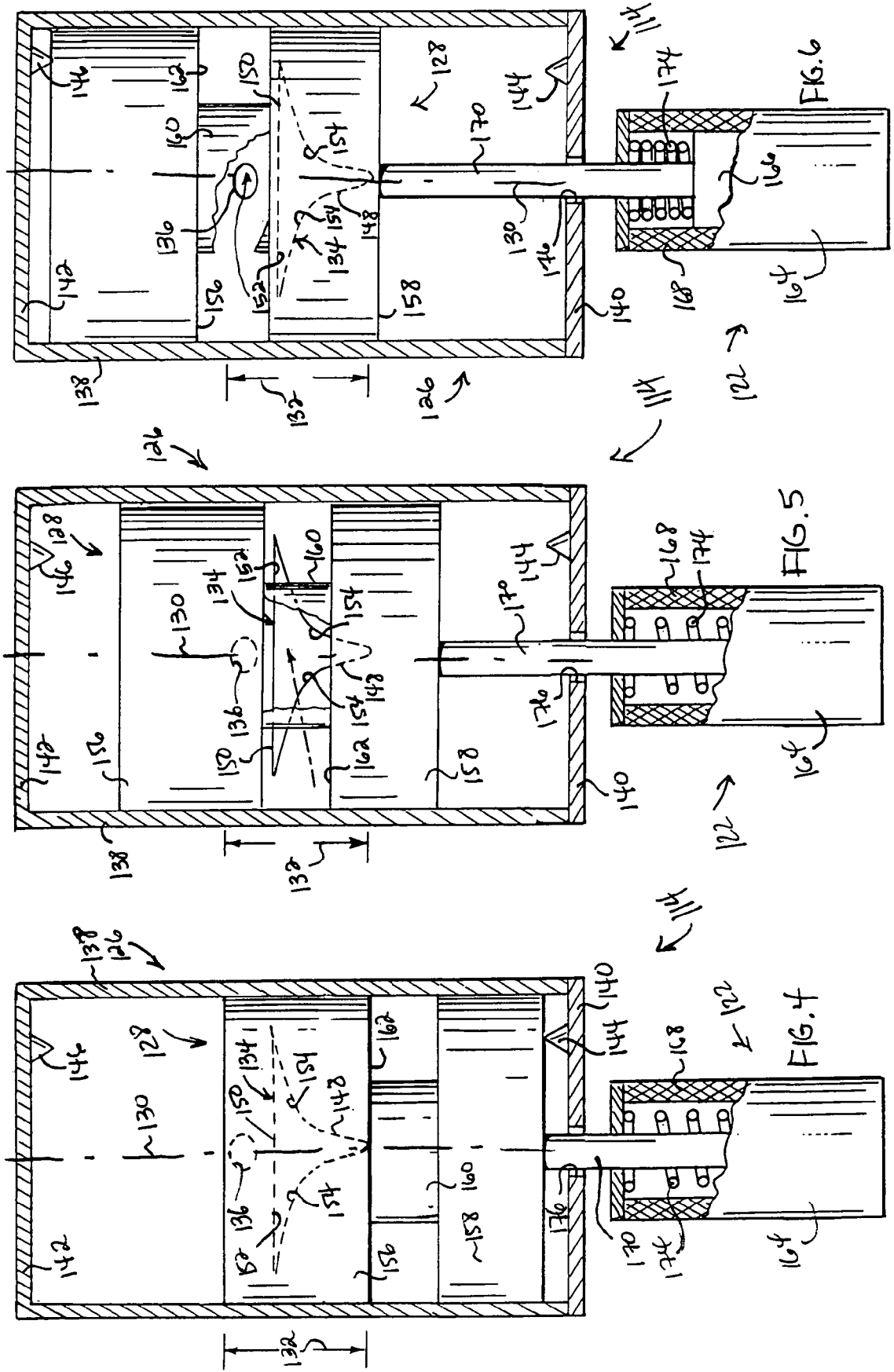

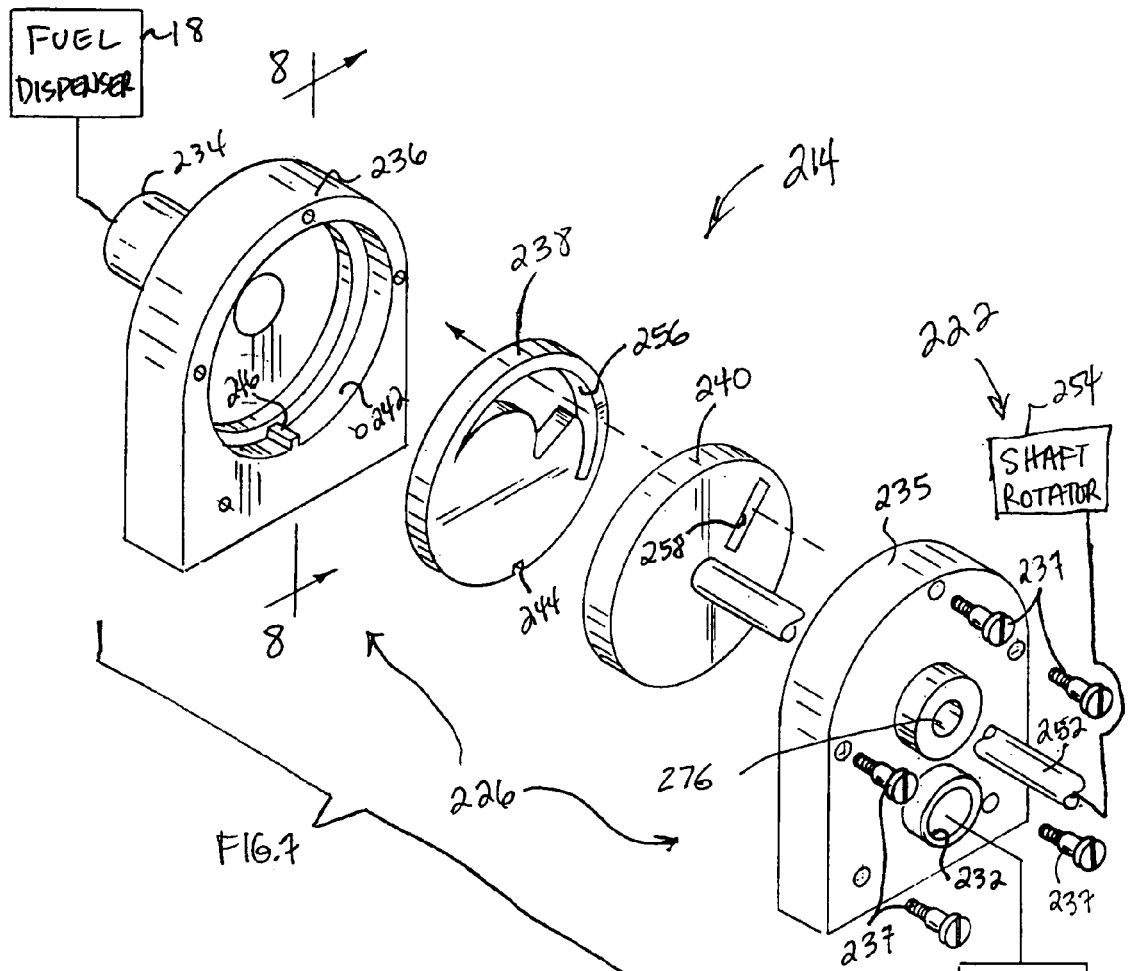
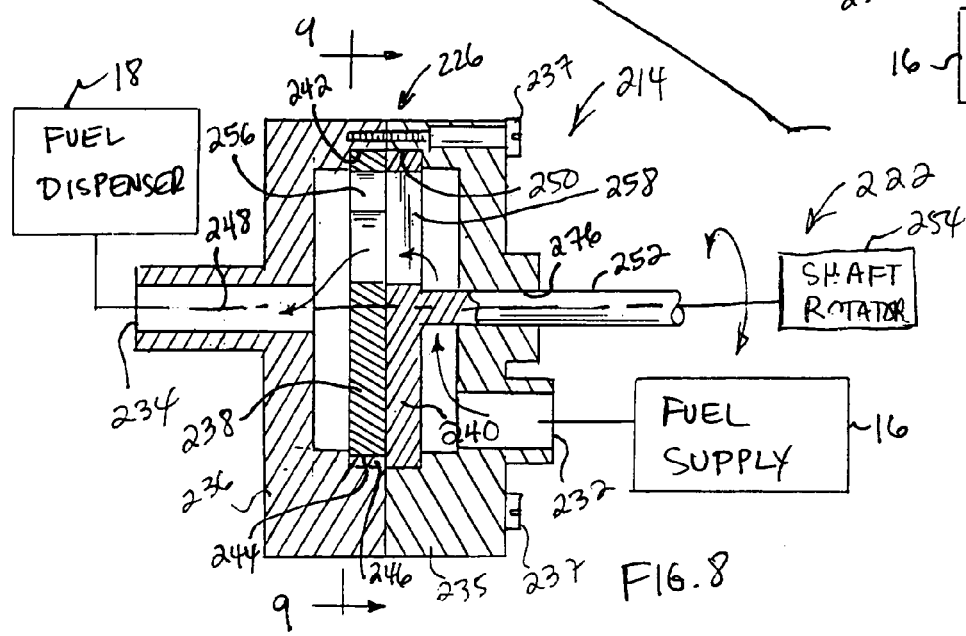

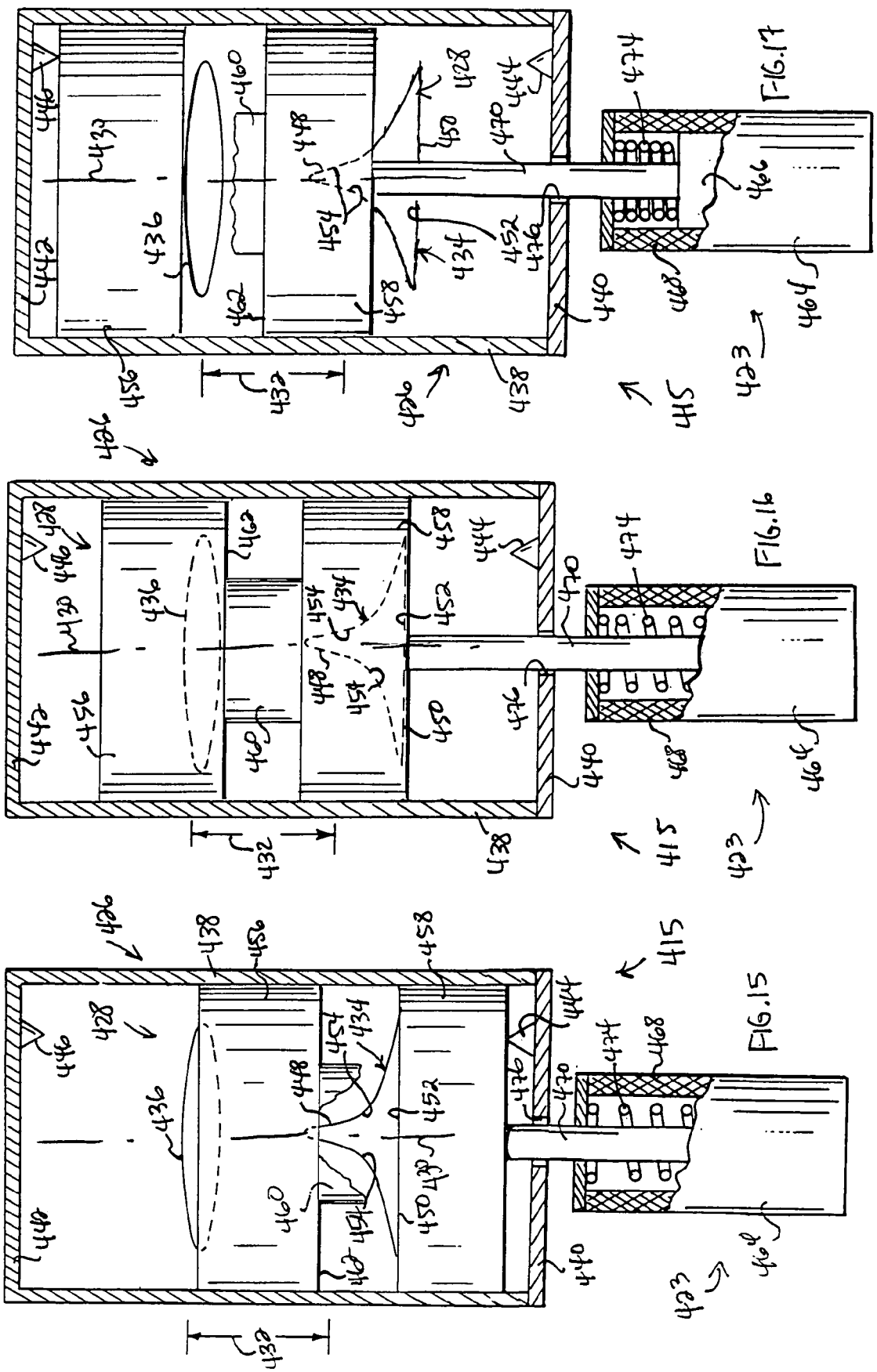

GAS TURBINE ENGINE FUEL SYSTEM WITH FUEL METERING VALVE

CROSS-REFERENCE TO RELATED APPLICATIONS

The present application claims the benefit of U.S. Provisional Patent Application No. 60/765,126 filed Feb 3, 2006, which is incorporated herein by reference.

FIELD OF THE INVENTION

The present invention relates generally to the field of gas turbine engines. More specifically, the present invention relates to gas turbine engine fuel systems and fuel metering valves thereof.

BACKGROUND

There are gas turbine engine fuel systems which include a main fuel metering valve and another fuel metering valve referred to as a fuel shut-off valve. These valves operate to control flow of fuel from a fuel supply to a combustor where the fuel is combusted with pressurized air. The main fuel metering valve has the primary responsibility for metering fuel from the fuel supply to the combustor. The fuel shut-off valve serves as a back-up to the main fuel metering valve in the event that operation of the main fuel metering valve becomes impaired.

Such fuel metering valves often have an operating position range with opposite end positions. In some cases, one end position results in a minimum flow condition and the other end position results in a maximum flow condition. This disclosure pertains to enhancements in the design of such fuel metering valves.

SUMMARY

One form of the present invention contemplates a gas turbine engine fuel system comprising a fuel metering valve. The fuel metering valve is configured to move within an operating position range having a first end position for establishing a first fuel flow rate, a second end position for establishing a second fuel flow rate, and an intermediate position located between the first and second end positions for establishing a third fuel flow rate. The first and second fuel flow rates are either both higher than or both lower than the third fuel flow rate.

Another form of the present invention contemplates that the fuel metering valve is configured as an "axial" valve. In such a case, the fuel metering valve may comprise a housing and a piston unit. The housing defines an inlet port and first and second outlet ports. The piston unit is positioned in the housing and coupled to the valve actuator to be moved thereby relative to the housing along an axis of the housing within an operating position range having first and second end positions and an intermediate position located therebetween to control flow of fuel from the inlet port to the first and second outlet ports. The fuel flow rates established by the first and second end positions are both lower than or both higher than a fuel flow rate established by the intermediate position.

Another form of the present invention contemplates that the fuel metering valve is configured as a "rotary" valve. In such a case, the fuel metering valve may comprise a housing, a fixed orifice plate positioned in and stationary relative to the housing and defining a fixed orifice, and a rotatable orifice plate positioned next to the fixed orifice plate and defining a rotatable orifice. The housing defines an inlet port and an outlet port. The rotatable orifice plate is coupled to the valve actuator to be rotated thereby relative to the housing and the fixed orifice plate within an operating position range having a first end position, a second end position, and an intermediate position located therebetween. The fixed and rotatable orifices cooperate to define a variable effective fuel flow area that is configured to control fuel flow from the inlet port to the outlet port and is either larger at both of the first and second end positions than at the intermediate position or smaller at both of the first and second end positions than at the intermediate position.

BRIEF DESCRIPTION OF THE DRAWINGS

FIG. 4 is an illustrative sectional view taken along lines 4-4 of FIG. 3 illustrating a piston unit in a first end position;

FIG. 5 is an illustrative sectional view illustrating the piston unit of FIG. 4 in an intermediate position;

FIG. 6 is an illustrative sectional view illustrating the piston unit of FIG. 4 in a second end position;

FIG. 7 is an illustrative exploded view illustrating a rotary fuel metering valve configured to achieve the flow characteristics such as those illustrated in FIG. 2;

FIG. 8 is an illustrative sectional view taken along lines 8-8 of FIG. 7;

FIG. 15 is an illustrative sectional view taken along lines 15-15 of FIG. 14 illustrating a piston unit in a first end position;

FIG. 16 is an illustrative sectional view illustrating the piston unit of FIG. 14 in an intermediate position; and FIG. 17 is an illustrative sectional view illustrating the piston unit of FIG. 14 in a second end position.

DESCRIPTION OF THE ILLUSTRATIVE EMBODIMENTS

Figure 1:
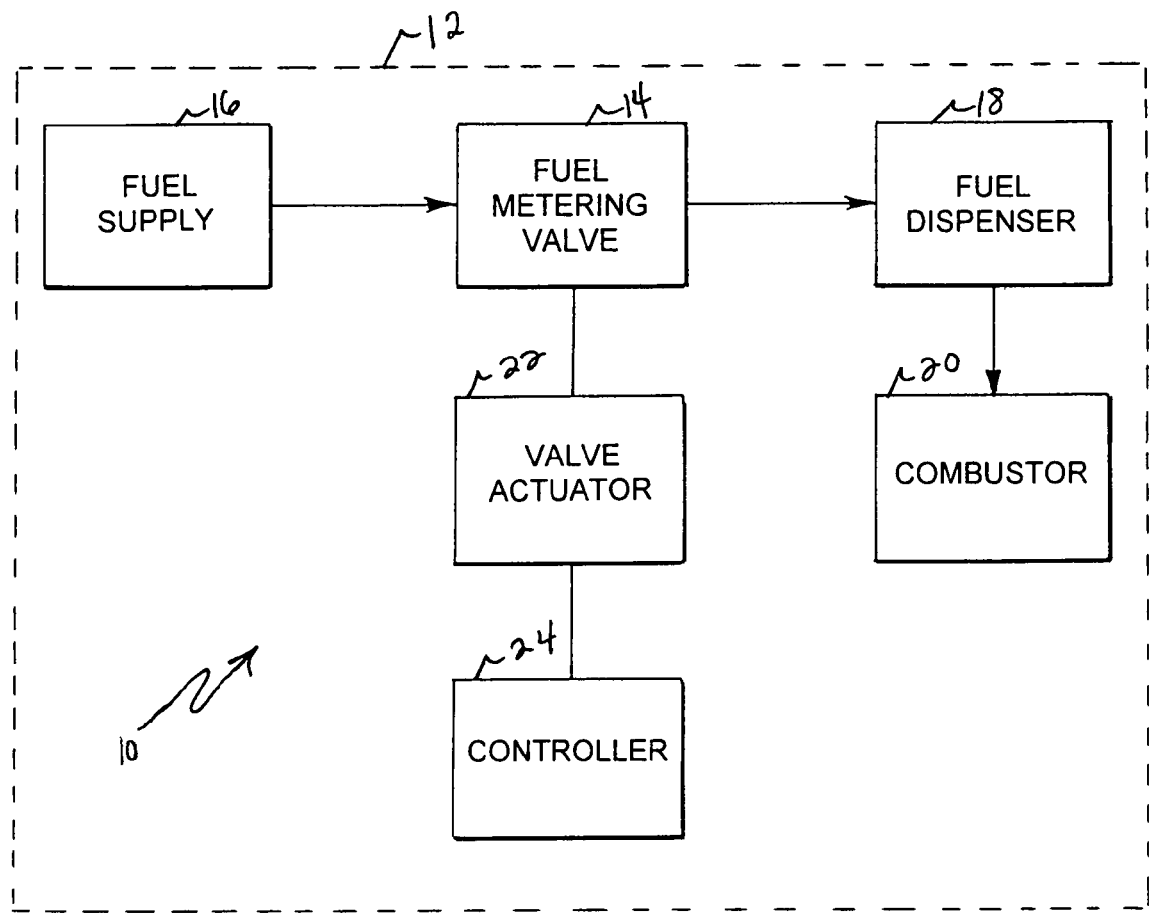
FIG. 1 is an illustrative block diagram of a fuel system of a gas turbine engine.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

With reference to FIG. 1, there is illustrated a block diagram of a fuel system 10 of a gas turbine engine 12. Gas turbine engines contemplated herein are particularly applicable for, but not limited to, aircraft flight propulsion systems or industrial power plants. In one form the gas turbine engine 12 includes a compressor for providing a pressurized working fluid, a combustor for burning a fuel and the pressurized working fluid to produce a hot exhaust gas and a turbine for extracting work from the hot exhaust gas. However, it should be understood that the present inventions are applicable with virtually all types and configurations of gas turbine engines.

It should be understood that the term "aircraft" is generic and is meant to include helicopters, airplanes, missiles, unmanned space devices, transatmospheric vehicles and other substantially similar devices. Additionally, it should be understood that gas turbine engines are also suited to be used in industrial applications, such as, for example, pumping sets for gas and oil transmission lines, electricity generation, and/or naval/sea based propulsion. Further, a gas turbine engine has application in other types of land based applications including propelling motor vehicles.

The fuel system 10 includes a fuel metering valve 14 for metering the flow of fuel from a fuel supply 16 to a fuel dispenser 18 configured to dispense fuel into a combustor 20 of the engine 12 where fuel is combusted with pressurized air to produce a hot exhaust gas flow. The hot exhaust gas flow may be used directly to produce engine thrust or may be passed through a turbine to extract work to be used as shaft power. A valve actuator 22 under the control of a controller 24 is coupled to the valve 14 to move a movable component of the valve 14 within an operating position range. The valve actuator 22 may be, for example, any one or more of a hydraulic actuator, an electrical actuator, a pneumatic actuator, and a servo mechanism.

The fuel metering valve 14 is configured to promote avoidance of a potential over-thrust condition of the engine 12. Avoidance of such potential engine over-thrust conditions may be particularly useful in connection with an outboard engine attached to a wing of an airplane to promote control of the airplane.

Figure 2:
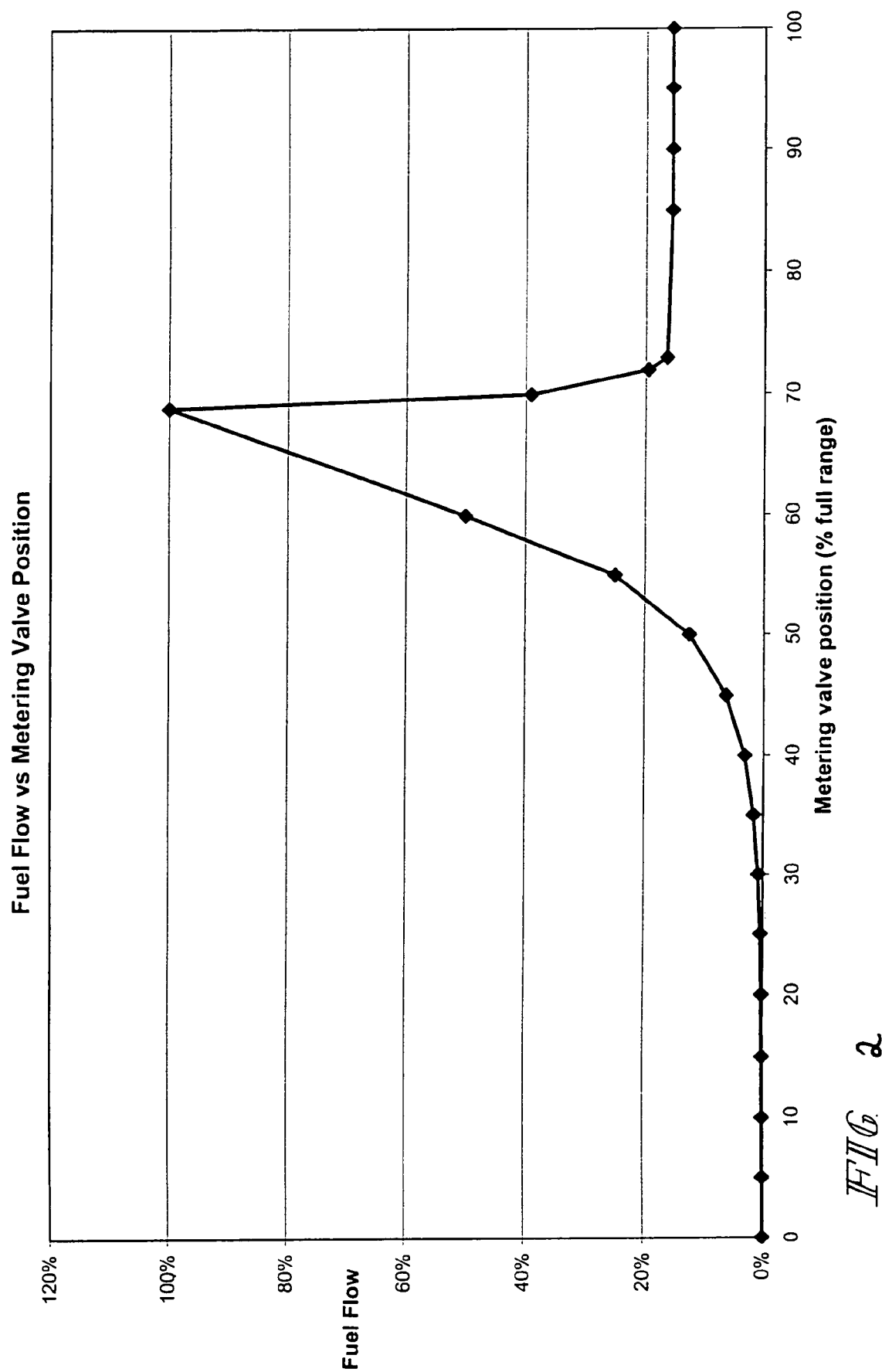
FIG. 2 is an illustrative graph representing fuel flow versus fuel metering valve position.

With reference to FIG. 2, there is illustrated a graph representing fuel flow versus valve position for one form of the valve 14. As indicated in the graph, the operating position range of the valve 14 includes opposite first and second end positions corresponding to the 0% and 100% valve positions, respectively, and includes a number of intermediate positions located therebetween.

The first end position (0% position in FIG. 2) is used to establish a first fuel flow rate which, illustratively, is a zero flow rate. It is within the scope of this disclosure for the first fuel flow rate to be a non-zero, relatively low flow rate.

The second end position (100% position in FIG. 2) is used to establish a second fuel flow rate which, illustratively, is a non-zero, relatively low flow rate. Such a low flow rate provides a "sustaining" flow of fuel to the combustor 20 in order to, for example, provide power for operating engine components or other components and/or reduce "windmill" drag that could potentially result from shutdown of the engine 12. It is within the scope of this disclosure for the second fuel flow rate to be a zero flow rate.

The maximum fuel flow rate, or third fuel flow rate, for the valve 14 is established at an intermediate position located between the first and second end positions. In one form of the present application this maximum fuel flow rate intermediate position happens to be at about the 68% position in FIG. 2, although it is to be understood that this maximum fuel flow rate intermediate position could be at other intermediate positions depending on the desired flow characteristics for a particular application.

The first and second fuel flow rates established by the first and second end positions of the valve 14 are thus both lower than the third fuel flow rate established by the intermediate position. Such a configuration of the fuel metering valve 14 promotes avoidance of a potential over-thrust condition of the engine 12 in the event of a performance irregularity associated with operation of the valve actuator 22. The performance irregularity may result, for example, from a loss of electrical power to the valve actuator 22 or from an electrical short circuit causing an over-supply of electrical power to the valve actuator 22.

When the valve actuator 22 "fails" in these situations, it may drive the valve 14 to either one of the first and second end positions causing the valve to become "stuck" in that position. However, since each of the flow rates established by the first and second end positions is a zero fuel flow rate or a relatively low, sustaining fuel flow rate and not a relatively high or maximum fuel flow rate, a potential over-thrust condition of the engine 12 is avoided.

In addition, the fuel metering valve 14 is the only fuel metering valve of the system 10 located between the fuel supply 16 and the fuel dispenser 18. In particular, there is no fuel shut-off valve located between the fuel supply 16 and the fuel dispenser 18 since the valve 14 is configured to "handle" the aforementioned valve actuator performance irregularities.

Figure 3:
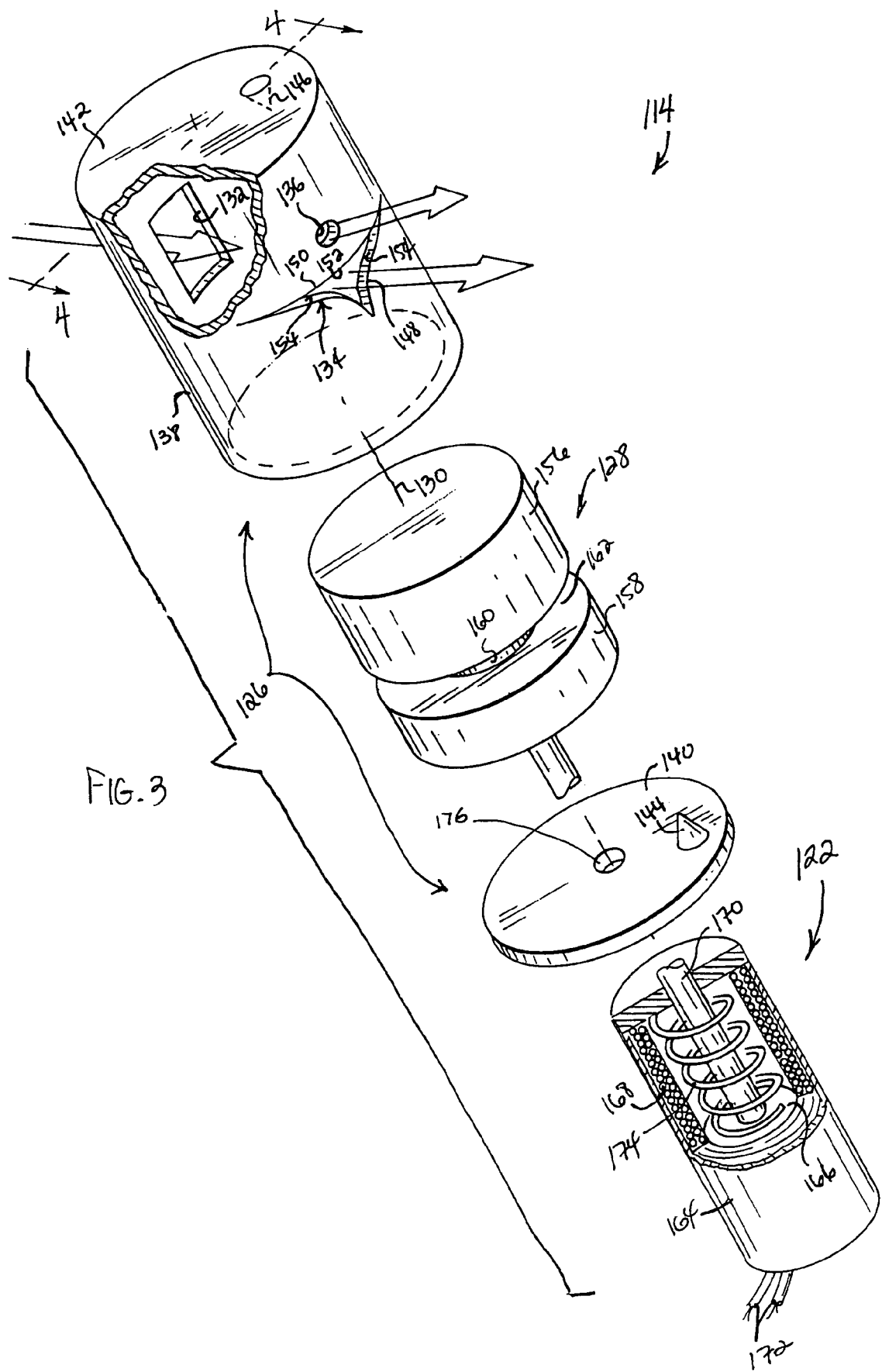
FIG. 3 is an illustrative exploded fragmentary perspective view illustrating an axial fuel metering valve configured to achieve flow characteristics such as those illustrated in FIG. 2.

With reference to FIG. 3, there is shown a fuel metering valve 114 for use as the fuel metering valve 14 of the gas turbine engine fuel system 10. There is also shown one example of a valve actuator 122 for use as the valve actuator 22 of the system 10. Illustratively, the valve 114 is an "axial" valve and the valve actuator 122 is a solenoid valve actuator. While the valve actuator 122 will be described in one form with reference to a solenoid valve actuator it is fully contemplated herein that the valve actuator may take other forms including a hydraulic actuator, a pneumatic actuator and/or a servo mechanism.

The valve 114 includes a housing 126 and a piston unit 128 captured in the housing 126 for axial movement relative to the housing 126 along an axis 130 within an operating position range having first and second end positions and intermediate positions located therebetween in response to movement of the actuator 122. In this way, the piston unit 128 is able to control flow of fuel from an inlet port 132 defined in the housing 126 to profiled first and second outlet ports 134, 136 defined in the housing 126.

The housing 126 includes a sleeve 138 and end walls 140, 142 coupled to opposite ends of the sleeve 138. The sleeve 138 is formed to include the ports 132, 134, 136. Stops 144, 146 are coupled to the end walls 140, 142 for engagement with the piston unit 128 to establish the first and second end positions of the piston unit 128.

The first outlet port 134 is generally T-shaped. As such, the port 134 has an axially extending base portion 148 and a circumferentially extending cross portion 150 which is located between the base portion 148 and the second outlet port 136.

The first outlet port 134 is defined by an end surface 152 and a pair of convex side surfaces 154. The end surface 152 extends circumferentially but not axially and is located between the side surfaces 154 and the second outlet port 136. The side surfaces extend axially and circumferentially from one another to opposite ends of the end surface 152.

The second outlet port 136 is generally oval-shaped. It is relatively small compared to the first outlet port 134. As such, it extends circumferentially along its major axis less than a majority of the length of the end surface 152.

The piston unit 128 includes first and second pistons 156, 158 and a piston connector rod 160. The rod 160 connects the pistons 156, 158 to one another for axial movement together. In addition, the rod 160 spaces the pistons 156, 158 apart from one another to define a piston space 162 therebetween to allow communication between the inlet port 132 and the outlet ports 134, 136.

The valve actuator 122 includes an actuator housing 164, a plunger 166, a coil 168, an actuator rod 170, electrical leads 172, and a return spring 174. The plunger 166 is positioned for axial movement in the housing 164 to cause extension and retraction of the rod 170 relative to the housing 164 in response to energization and de-energization of the coil 168 by the leads 172. The actuator rod 170 extends through an aperture 176 formed in the wall 140 and is coupled to the piston 158 so that such axial movement of the rod 170 causes corresponding axial movement of the piston unit 128 between its first and second end positions. The return spring 174 is positioned in the housing 164 to retract the rod 170 and thereby move the piston unit 128 to its first end position when the coil 168 is de-energized. While the piston unit 128 is described with reference to the valve actuator 122 it is contemplated herein that the piston unit 128 is moveable by other types of actuators.

With reference to FIG. 4, there is shown the piston unit 128 positioned in its first end position in response to de-energization of the coil 168 due to, for example, a loss of electrical power to the actuator 122. In the first end position, the first piston 156 covers the entirety of both outlet ports 134,136 so that communication between the inlet port 132 and the outlet ports 134,136 is blocked. This results in a zero fuel flow rate in the system 10 and avoids a potential over-thrust condition of the engine 12.

With reference to FIG. 5, there is shown the piston unit 128 positioned in an intermediate, maximum flow rate position. In this position, the first piston 156 covers the entirety of the second outlet port 136 and the second piston 158 covers a part of the base portion 148 of the first outlet port 134. On the other hand, the cross portion 150 of the first outlet port 134 and a part of the base portion 148 is uncovered so as to allow communication between the inlet port 132 and the uncovered portion of the first outlet port 134 through the piston space 162. This results in a maximum fuel flow rate from the fuel supply 16 through the housing 126 to the fuel dispenser 18. If one of the aforementioned actuator fault modes occurs, the piston unit 128 will be driven away from this intermediate, maximum flow rate position to one of the end positions. As such, a potential over thrust condition of the engine 12 associated with the fuel metering valve 114 is avoided.

With reference to FIG. 6, there is shown the piston unit 128 positioned in its second end position in response to high energization of the coil 168 due to, for example, a short circuit in the electrical circuitry that supplies electrical power to the leads 172. In the second end position, the second piston 158 covers the entirety of the first outlet port 134 whereas the second outlet port 136 is uncovered so that communication between the inlet port 132 and the second outlet port 136 is allowed through the piston space 162. This results in a relatively low, sustaining fuel flow rate in the system 10 so as to avoid a potential over-thrust condition of the engine 12.

With reference to FIGS. 7 and 8, there is shown a fuel metering valve 214 for use as the fuel metering valve 14 of the gas turbine engine fuel system 10. There is also shown a valve actuator 122 for use as the valve actuator 22 of the system 10. Illustratively, the valve 214 is a "rotary" valve and the valve actuator 222 is an electric motor. While the valve actuator 222 will be described in one form with reference to a electric motor it is fully contemplated herein that the valve actuator may take other forms including a hydraulic actuator, a pneumatic actuator and/or a servo mechanism.

The valve 214 includes a housing 226 defining an inlet port 232 and an outlet port 234. The inlet port 232 is configured to admit fuel from the fuel supply 16 into the housing 226 and the outlet port 234 is configured to discharge fuel from the housing 226 to flow to the fuel dispenser 18. The housing 226 includes first and second components 235, 236 coupled together by fasteners 237.

Captured between the housing components 235, 236 are a pair of relatively rotatable profiled orifice plates. Specifically, there are a fixed orifice plate 238 and a rotatable orifice plate 240 positioned within the housing 226.

The fixed orifice plate 238 is mounted so as to be stationary relative to the housing 226. Illustratively, the fixed orifice plate 238 is positioned in a recessed portion 242 formed in the housing component 236. The fixed orifice plate 238 defines a notch 244 receiving an anti-rotation tab 246 coupled to the recessed portion 242 so that the plate 238 is prevented from rotating about a rotation axis 248 of the valve 214.

The rotatable orifice plate 240 is mounted so as to be rotatable relative to the housing 226 and the fixed orifice plate 238. The rotatable orifice plate 240 is positioned in face-to-face contact with the fixed orifice plate 238 and is received in a recessed portion 250 formed in the housing member 235 for rotation therein about the axis 248.

The actuator 222 is configured, for example, as an electric motor having a drive shaft 252 and a shaft rotator 254 for rotating the drive shaft 252. The drive shaft 252 extends through an aperture 276 defined in the housing 226 to rotate the rotatable orifice plate 240 about the axis 248.

The fixed orifice plate 238 defines a fixed orifice 256 and the rotatable orifice plate 240 defines a rotatable orifice 258. The orifices 256, 258 cooperate to define an effective fuel flow area that is variable in size in response to rotation of the rotatable orifice plate 240 relative to the fixed orifice plate 238. The effective fuel flow area is smaller at both of the first and second end positions than at the intermediate position.

Figure 9:
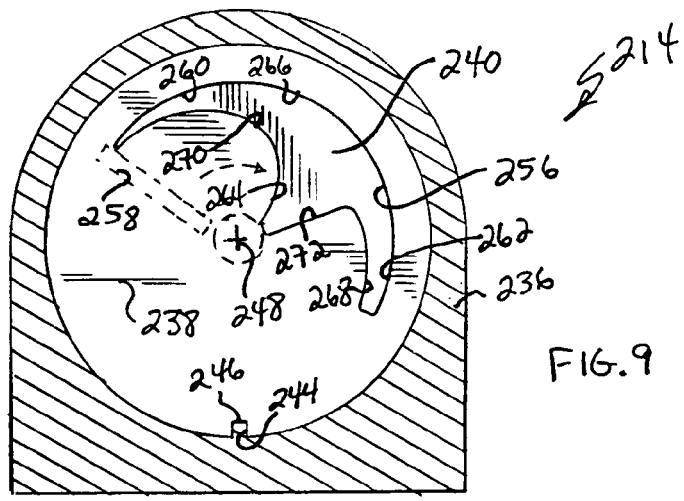
FIG. 9 is an illustrative sectional view taken along lines 9-9 of FIG. 8 illustrating a rotatable orifice positioned in a first end position relative to a fixed orifice.
Figure 10:
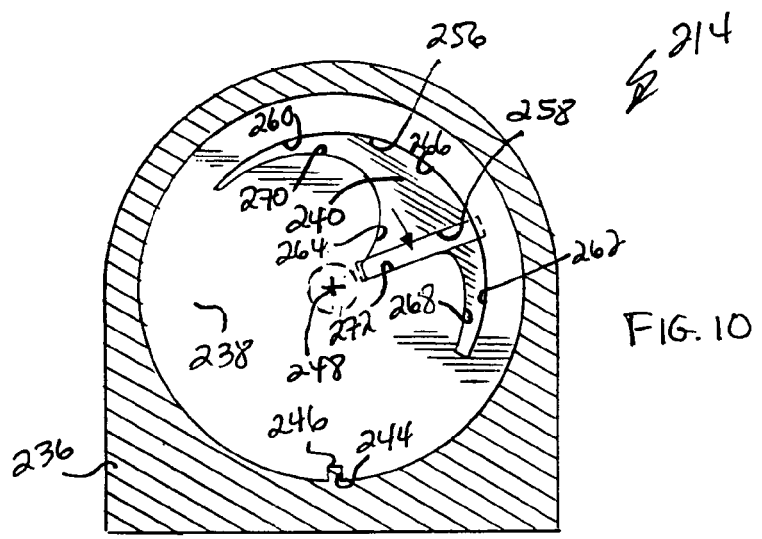
FIG. 10 is an illustrative sectional view illustrating the rotatable orifice positioned in an intermediate position.
Figure 11:
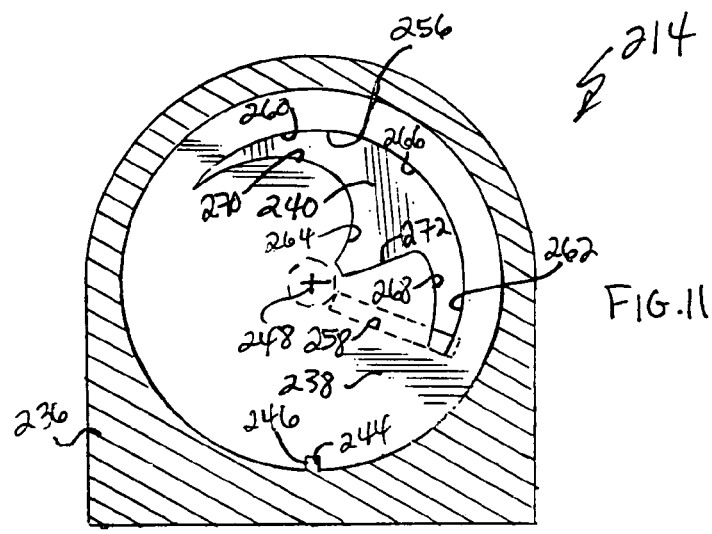
FIG. 11 is an illustrative sectional view illustrating the rotatable orifice positioned in a second end position.

With reference to FIGS. 9-11, the orifices 256, 258 are configured to provide the fuel flow characteristics such as represented in FIG. 2. The rotatable orifice 258 is configured as a radially extending rectangular slot.

The fixed orifice 256 has first and second end regions 260, 262 and an intermediate region 264 positioned between the first and second end regions 260, 262. Each of the first and second end regions 260, 262 has a radial thickness that is smaller than a radial thickness of the intermediate region 264.

The fixed orifice 256 is defined by a first arcuate surface 266, a second arcuate surface 268, a convex surface 270, and a generally straight radial surface 272. Each of the second arcuate surface 268, the convex surface 270, and the radial surface 272 is positioned radially inwardly from the first arcuate surface 266. The radial surface 272 is positioned between the second arcuate surface 268 and the convex surface 270 and extends radially but not circumferentially. The first end region 260 is defined between the first arcuate surface 266 and the convex surface 270. The second end region 260 is defined between the first arcuate surface 266 and the second arcuate surface 268. The intermediate region 264 is defined between the first arcuate surface 266, the convex surface 270, and the radial surface 272.

With reference to FIG. 9, there is shown the rotatable orifice 258 positioned in the first end position in response, for example, to a loss of electrical power to the actuator 222. In the first end position, the rotatable orifice 258 does not overlap any part of the fixed orifice 256. As such, the effective fuel flow area is closed so as to produce a zero fuel flow rate in the system 10. In other words, there is no fuel flow from the fuel supply 16 through the valve 214 to the fuel dispenser 18 when the rotatable orifice 258 is positioned in the first end position. Such a configuration avoids a potential over-thrust condition of the engine 12.

With reference to FIG. 10, there is shown the rotatable orifice 258 positioned in an intermediate, maximum flow rate position. In this position, the rotatable orifice 258 overlaps the intermediate region 264 of the fixed orifice 256. This results in a maximum size effective fuel flow area and thus a maximum fuel flow rate from the fuel supply 16 through the housing 226 to the fuel dispenser 18. If one of the aforementioned actuator fault modes occurs, the rotatable orifice 258 will be driven away from this intermediate, maximum flow rate position to one of the end positions. As such, a potential over-thrust condition of the engine 12 is avoided.

With reference to FIG. 11, there is shown the rotatable orifice 258 positioned in the second end position in response, for example, to a short circuit in the electrical circuitry that supplies electrical power to the actuator 222. In the second end position, the rotatable orifice 258 overlaps the second end region 262. This results in a relatively small effective fuel flow area and thus a relatively low, sustaining fuel flow rate in the system 10 so as to avoid a potential engine over-thrust condition.

Figure 12:
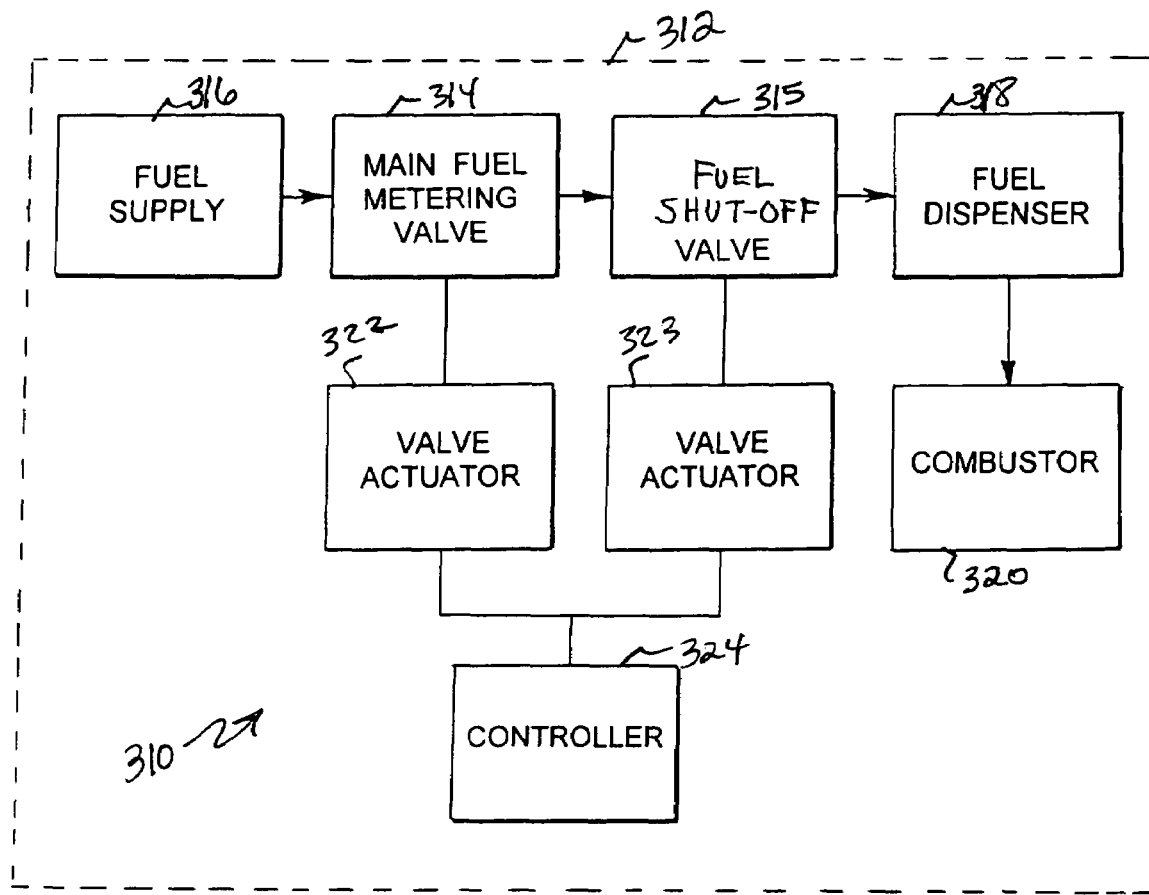
FIG. 12 is an illustrative block diagram of a fuel system of a gas turbine engine.

With reference to FIG. 12, there is illustrated a block diagram of a fuel system 310 of a gas turbine engine 312. The fuel system 310 includes a main fuel metering valve 314 and another fuel metering valve configured as a fuel shut-off valve 315. The main fuel metering valve 314 has the primary responsibility for metering flow of fuel from a fuel supply 316 to a fuel dispenser 318 configured to dispense fuel into a combustor 320 of the engine 312 where fuel is combusted with pressurized air to produce the hot exhaust gas flow.

The fuel shut-off valve 315 serves to meter the fuel flow if operation of the main fuel metering valve 314 becomes impaired. As such, the fuel shut-off valve 315 is normally in a maximum flow position and operates to restrict fuel flow when it is activated to back up the main fuel metering valve 314.

There are separate valve actuators for the valves 314, 315. A valve actuator 322 under the control of a controller 324 is coupled to the valve 314 to move the valve 314 within its operating position range. Similarly, a valve actuator 323 under the control of the controller 324 is coupled to the valve 315 to move movable components of the valve 315 within its operating position range. Each actuator 322, 323 may be, for example, any one or more of a hydraulic actuator, an electrical actuator, a pneumatic actuator, and a servo mechanism.

Figure 13:
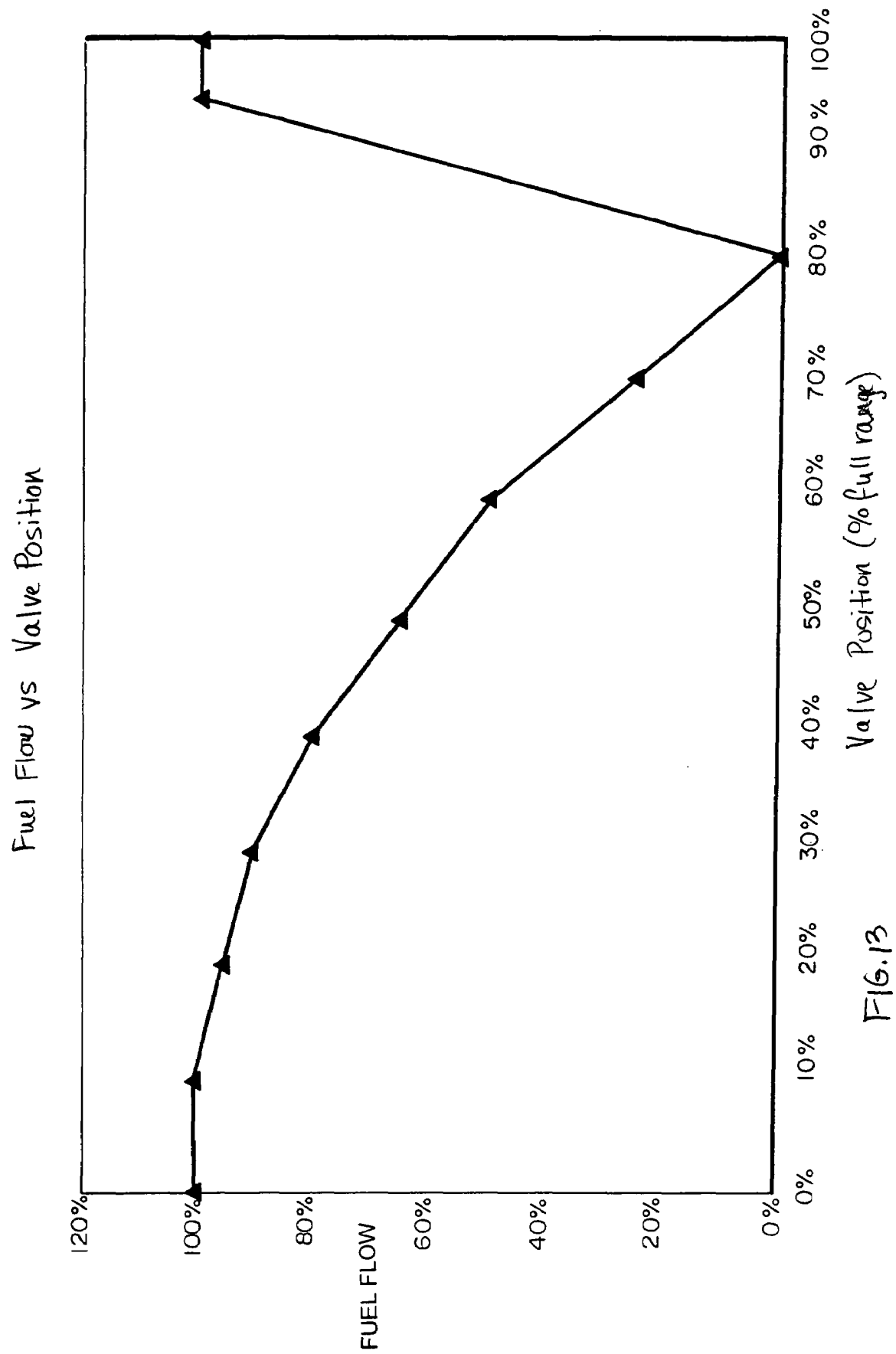
FIG. 13 is an illustrative graph representing fuel flow versus fuel metering valve position.

With reference to FIG. 13, there is illustrated a graph representing fuel flow versus valve position for the valve 315. As indicated in the graph, the operating position range of the valve 315 includes opposite first and second end positions corresponding to the 0% and 100% valve positions, respectively, and includes a number of intermediate positions located therebetween. The first end position (0% position in FIG. 13) is used to establish a first fuel flow rate which, illustratively, is a relatively high, maximum fuel flow rate. Similarly, the second end position (100% position in FIG. 13) is used to establish a second fuel flow rate which, illustratively, is the relatively high, maximum fuel flow rate.

The minimum fuel flow rate, or third fuel flow rate, for the valve 315 is established at an intermediate position located between the first and second end positions. This minimum fuel flow rate intermediate position happens to be at about the 80% position in FIG. 13, although it is to be understood that this minimum fuel flow rate intermediate position could be at other intermediate positions depending on the desired flow characteristics for a particular application. Illustratively, the minimum fuel flow rate is a zero flow rate, although it is within the scope of this disclosure for the minimum fuel flow rate to be a relatively low, non-zero fuel flow rate.

The first and second fuel flow rates established by the first and second end positions of the valve 315 are thus both higher than the third fuel flow rate established by the intermediate position. Such a configuration of the fuel shut-off valve 315 promotes control of the fuel flow by the main metering valve 314 in the event of a performance irregularity associated with operation of the valve actuator 323. The performance irregularity may result, for example, from a loss of electrical power to the valve actuator 323 or from an electrical short circuit causing an over-supply of electrical power to the valve actuator 323.

When the valve actuator 323 "fails" in these situations, it may drive the valve 315 to either one of the first and second end positions causing the valve to become "stuck" in that position. However, since each of the fuel flow rates established by the first and second end positions is a relatively high or maximum fuel flow rate and not a relatively low or zero fuel flow rate, the main fuel metering valve 314 is able to retain primary control for metering fuel flow from the fuel supply 316 to the fuel dispenser 318.

Figure 14:
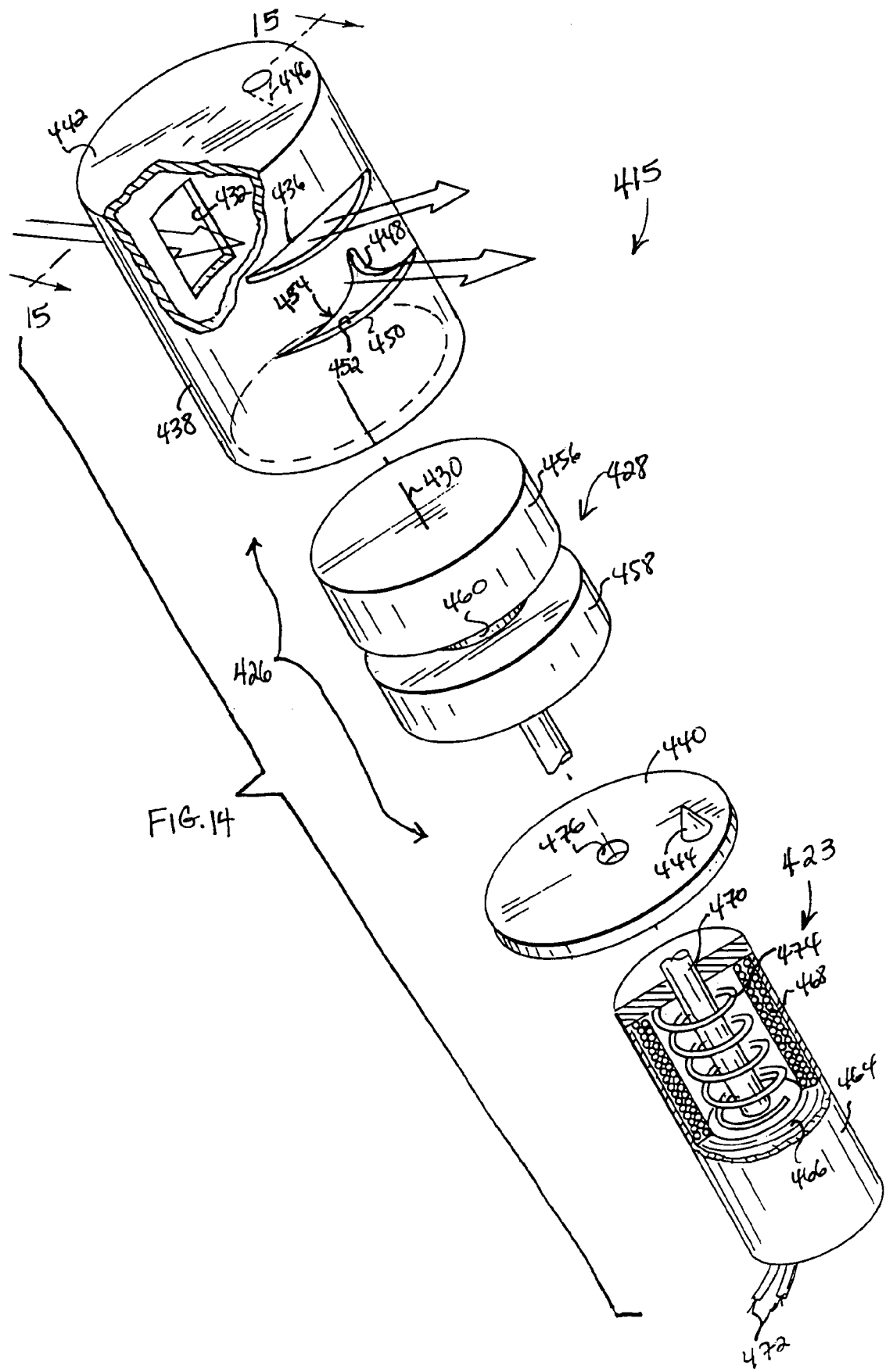
FIG. 14 is an illustrative exploded fragmentary view illustrating a second axial fuel metering valve configured as a fuel shut-off valve to achieve flow characteristics such as those illustrated in FIG. 13.

With reference to FIG. 14, there is shown a fuel shut-off valve 415 for use as the fuel shut-off valve 315 of the gas turbine engine fuel system 310. There is also shown a valve actuator 423 for use as the valve actuator 323 of the system 310. Illustratively, the valve 415 is an "axial" valve and the valve actuator 423 is a solenoid valve actuator.

The valve 415 includes a housing 426 and a piston unit 428 captured in the housing 426 for axial movement relative to the housing 426 along an axis 430 within an operating position range having first and second end positions and intermediate positions located therebetween in response to movement of the actuator 423. In this way, the piston unit 428 is able to control flow of fuel from an inlet port 432 defined in the housing 426 to profiled first and second outlet ports 434, 436 defined in the housing 426.

The housing 426 includes a sleeve 438 and end walls 440, 442 coupled to opposite ends of the sleeve 438. The sleeve 438 is formed to include the ports 432, 434, 436. Stops 444, 446 are coupled to the end walls 440, 442 for engagement with the piston unit 428 to establish the first and second end positions of the piston unit 428.

The first outlet port 434 is generally T-shaped. As such, the port 434 has an axially extending base portion 448 and a circumferentially extending cross portion 450. The base portion 448 is located between the cross portion 450 and the second outlet port 436.

The first outlet port 434 is defined by an end surface 452 and a pair of convex side surfaces 454. The end surface 452 extends circumferentially but not axially and is located between the side surfaces 454. The side surfaces 454 extend axially and circumferentially from one another to opposite ends of the end surface 452 and are located between the end surface 452 and the second outlet port 436.

The second outlet port 436 is generally oval-shaped. The second outlet port 436 extends circumferentially along its major axis substantially the length of the end surface 452.

The piston unit 428 includes first and second pistons 456, 458 and a piston connector rod 460. The rod 460 connects the pistons 456, 458 to one another for axial movement together. In addition, the rod 460 spaces the pistons 456, 458 apart from one another to define a piston space 462 therebetween to allow communication between the inlet port 432 and the outlet ports 434, 436.

The valve actuator 423 includes an actuator housing 464, a plunger 466, a coil 468, an actuator rod 470, electrical leads 472, and a return spring 474. The plunger 466 is positioned for axial movement in the housing 464 to cause extension and retraction of the rod 470 relative to the housing 464 in response to energization and de-energization of the coil 468 by leads 472. The actuator rod 470 extends through an aperture 476 formed in the wall 440 and is coupled to the piston 458 so that such axial movement of the rod 470 causes corresponding axial movement of the piston unit 428 between its first and second end positions. The return spring 474 is positioned in the housing 464 to retract the rod 470 and thereby move the piston unit 428 to its first end position when the coil 468 is de-energized.

With reference to FIG. 15, there is shown the piston unit 428 positioned in its first end position in response to de-energization of the coil 468 due to, for example, a loss of electrical power to the actuator 422. In the first end position, the first piston 456 blocks communication between the inlet port 432 and the second outlet port 436. However, the pistons 456, 458 are positioned to allow communication between the inlet port 432 and the first outlet port 434 through the piston space 462 defined between the pistons 456, 458. This results in a maximum fuel flow rate through the valve 415 so as to allow the main fuel metering valve 414 to retain control of metering fuel flow in the system 310.

With reference to FIG. 16, there is shown the piston unit 428 positioned in an intermediate, zero fuel flow rate position. In this position, the first piston 456 covers the entirety of the second outlet port 436 and the second piston 458 covers entirety of the first outlet port 434 such that the first and second pistons 456, 458 cooperate to block communication between the inlet port 432 and the first and second outlet ports 434, 436. This results in a zero fuel flow rate through the valve 415 and in the system 310. If one of the aforementioned actuator fault modes occurs, the piston unit 428 will be driven away from this intermediate position to one of the first and second end positions in order to allow the main fuel metering valve 414 to exercise control over the fuel flow.

With reference to FIG. 17, there is shown the piston unit 428 positioned in its second end position in response to high energization of the coil 468 due to, for example, a short circuit in the electrical circuitry that supplies electrical power to the leads 472. In the second end position, the second piston 458 blocks communication between the inlet port 432 and the first outlet port 434. However, the pistons 456, 458 are positioned to allow communication between the inlet port 432 and the second outlet port 436 through the piston space 462. This results in a maximum fuel flow rate through the valve 415 so as to allow the main fuel metering valve 414 to retain control of metering fuel flow in the system 310.

It is within the scope of this disclosure for the fuel shut-off valve 315 to be configured as a rotary valve. In such a case, the valve has fixed and rotatable orifice plates similar to plates 238, 240 except that the fixed orifice is profiled to produce the flow characteristics of FIG. 13. To do so, the radial thickness of the intermediate region of the fixed orifice formed in the fixed orifice plate may be more narrow than the radial thickness of each of the first and second end regions of the fixed orifice.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A gas turbine engine fuel system, comprising:
   a fuel metering valve configured to move within an operating position range having a first end position for establishing a first fuel flow rate, a second end position for establishing a second fuel flow rate, and an intermediate position located between the first and second end positions for establishing a third fuel flow rate such that the first and second fuel flow rates are either both higher than or both lower than the third fuel flow rate.

2. The system of claim 1, further comprising a valve actuator coupled to the valve and configured to move the valve to the first end position in response to a first performance irregularity associated with operation of the valve actuator and to the second end position in response to a second performance irregularity associated with operation of the valve actuator.

3. The system of claim 1, further comprising a fuel supply and a fuel dispenser for dispensing fuel to a combustor, wherein the fuel metering valve is the only fuel metering valve positioned between the fuel supply and the fuel dispenser and is configured such that the first and second fuel flow rates established by the first and second end positions are both lower than the third fuel flow rate established by the intermediate position.

4. The system of claim 1, further comprising a fuel supply, a fuel dispenser for dispensing fuel to a combustor, and a main fuel metering valve, wherein the fuel metering valve is a fuel shut-off valve that is positioned between the fuel supply and the fuel dispenser along with the main fuel metering valve and is configured such that the first and second fuel flow rates established by the first and second end positions are both higher than the third fuel flow rate established by the intermediate position.

5. The system of claim 1, wherein:
   the valve comprises a housing and first and second pistons positioned in the housing and coupled to one another to define a piston space therebetween,
   the housing is formed to include an inlet port to admit fuel into the piston space and axially spaced-apart first and second outlet ports to discharge fuel from the piston space, and
   the first and second pistons are movable axially within the housing to cover and uncover at least portions of the first and second outlet ports to vary fuel flow from the inlet port through the piston space to the first and second outlet ports.

6. The system of claim 1, wherein:
the valve comprises relatively rotatable first and second orifice plates,
the first orifice plate defines a first orifice,
the second orifice plate defines a second orifice, and
the first and second orifice plates are positioned next to one another such that the first and second orifices cooperate to define an effective fuel flow area that is variable in size in response to relative rotation of the first and second orifice plates between the first end position, the second end position, and the intermediate position.

7. A gas turbine engine fuel system, comprising:
a valve actuator, and
a fuel metering valve comprising a housing and a piston unit, the housing defining an inlet port and first and second outlet ports, the piston unit being positioned in the housing and coupled to the valve actuator to be moved thereby relative to the housing along an axis of the housing within an operating position range having first and second end positions and an intermediate position located therebetween to control flow of fuel from the inlet port to the first and second outlet ports such that fuel flow rates established by the first and second end positions are both lower than or both higher than a fuel flow rate established by the intermediate position.

8. The system of claim 7, wherein the valve actuator is configured to move the piston unit axially to the first end position in response to a first performance irregularity associated with operation of the valve actuator and to move the piston unit axially to the second end position in response to a second performance irregularity associated with operation of the valve actuator.

9. The system of claim 7, wherein the fuel flow rates established by the first and second positions are both lower than the fuel flow rate established by the intermediate position.

10. The system of claim 7, wherein the fuel flow rates established by the first and second end positions are both higher than the fuel flow rate established by the intermediate position.

11. The system of claim 7, wherein the piston unit comprises first and second pistons coupled to one another to move together to cover and uncover at least portions of the first and second outlet ports.

12. The system of claim 11, wherein:
the first outlet port is generally T-shaped so as to comprise an axially extending base portion and a circumferentially extending cross portion,
in the first end position, the first piston blocks communication between the inlet port and the entirety of the first and second outlet ports,
in the intermediate position, the first and second pistons are positioned to allow communication between the inlet port and the cross portion through a piston spaced defined between the first and second pistons, the first piston blocks communication between the inlet port and the entirety of the second outlet port, and the second piston blocks communication between the inlet port and at least a part of the base portion, and
in the second end position, the first and second pistons are positioned to allow communication between the inlet port and the second outlet port through the piston space, and the second piston blocks communication between the inlet port and the entirety of the first outlet port.

13. The system of claim 11, wherein:
the first outlet port is generally T-shaped so as to comprise an axially extending base portion and a circumferentially extending cross portion,
in the first end position, the first and second pistons are positioned to allow communication between the inlet port and the cross portion through a piston space defined between the first and second piston, and the first piston blocks communication between the inlet port and the entirety of the second outlet port,
in the intermediate position, the first piston blocks communication between the inlet port and the entirety of the second outlet port, and the second piston blocks communication between the inlet port and the entirety of the first outlet port, and
in the second end position, the first and second pistons are positioned to allow communication between the inlet port and the second outlet port through the piston space, and the second piston blocks communication between the inlet port and the entirety of the first outlet port.

14. The system of claim 7, wherein:
the first outlet port is defined by an end surface and convex first and second side surfaces formed in said housing,
the end surface extends circumferentially but not axially,
the side surfaces extend axially and circumferentially from one another to the end surface, and
either
the end surface is located axially between the second outlet port and the first and second side surfaces, and the second outlet port extends circumferentially less than a majority of the length of the end surface, or
the first and second side surfaces are located axially between the second outlet port and the end surface, and the second outlet port extends circumferentially substantially the length of the end surface.

15. The system of claim 7, wherein:
the first outlet port is generally T-shaped and the second outlet port is generally oval-shaped,
the generally T-shaped first outlet port comprises a circumferentially extending cross portion and an axially extending base portion, and
either the cross portion is positioned between the base portion and the second outlet port or the base portion is positioned between the cross portion and the second outlet port.

16. A gas turbine engine fuel system, comprising:
a valve actuator, and
a fuel metering valve comprising a housing, a fixed orifice plate positioned in and stationary relative to the housing and defining a fixed orifice, and a rotatable orifice plate positioned next to the fixed orifice plate and defining a rotatable orifice, the housing defining an inlet port and an outlet port, the rotatable orifice plate being coupled to the valve actuator to be rotated thereby relative to the housing and the fixed orifice plate within an operating position range having a first end position, a second end position, and an intermediate position located therebetween, the fixed and rotatable orifices cooperating to define a variable effective fuel flow area that is configured to control fuel flow from the inlet port to the outlet port and is either larger at both of the first and second end positions than at the intermediate position or smaller at both of the first and second end positions than at the intermediate position.

17. The system of claim 16, wherein the valve actuator is configured to rotate the rotatable orifice plate to the first end position in response to a first performance irregularity associated with operation of the valve actuator and to rotate the rotatable orifice plate to the second end position in response to a second performance irregularity associated with operation of the valve actuator.

18. The system of claim 16, wherein the effective fuel flow area is smaller at both of the first and second end positions than at the intermediate position.

19. The system of claim 16, wherein:
the rotatable orifice is configured as a radially extending rectangular slot formed in the rotatable orifice plate,
the fixed orifice comprises first and second end regions and an intermediate region located therebetween, and
the first and second end regions have a radial thickness that is smaller than a radial thickness of the intermediate region.

20. The system of claim 19, wherein:
the fixed orifice is defined by a first arcuate surface, a second arcuate surface positioned radially inwardly from the first arcuate surface, a convex surface positioned radially inwardly from the first arcuate surface, and a generally straight radial surface that is positioned radially inwardly from the first arcuate surface, is positioned between the second arcuate surface and the convex surface, and extends radially but not circumferentially,
the first end region is defined between the first arcuate surface and the convex surface,
the second end region is defined between the first and second arcuate surfaces, and
the intermediate region is defined between the first arcuate surface, the convex surface, and the radial surface.

* * * * *